March 18, 1941.   M. ARENDS   2,235,003
WAVE FILTER CHAIN
Filed March 14, 1939
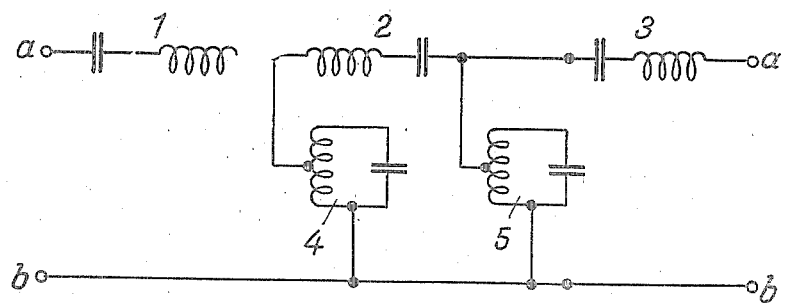
Inventor:
Menso Arends
by ℰ.ℭ.Phinney
Attorney.

Patented Mar. 18, 1941

2,235,003

UNITED STATES PATENT OFFICE 2,235,003

WAVE FILTER CHAIN

Menso Arends, Berlin, Germany, assignor to C. Lorenz Aktiengesellschaft, Berlin-Tempelhof, Germany, a company Application March 14, 1939, Serial No. 261,731
In Germany March 28, 1938

2 Claims. (Cl. 178—44)

This invention relates to wave filter chains and has for its object to provide means in order to reduce the space requirements of such devices.

It is a known expedient in the electric communication technics to employ filter chains which are formed by a number of individual series resonance circuits. These filter chains may be designed from the viewpoint of passing either a given frequency band or a narrow range of frequencies within a given band. The first mentioned type of band filter may consist of a plurality of series resonance circuits connected in tandem in one of the lines over which alternating communication currents are transmitted, while a parallel resonance circuit is shunted between each series circuit and the other line. The type of filter chains which is adapted to pass a narrow range only of a frequency band and which may be considered as an absorption chain comprises a number of parallel resonance circuits connected in series in one of the alternating message current conducting wires of a line and series resonance circuits across the individual parallel circuits and the other conductor of such line.

The sharpness of the attenuation characteristic of such filter chains is determined by the number of individual tandem connected resonance circuits and also by the design per se of these circuits. Experience teaches that relatively large capacities and relatively small inductances are required in the parallel resonance circuits in order to obtain the desired narrow passing range, that is the desired width of the rejecting or blocking range. However, the relatively large capacities which as above stated are required for securing the desired sharpness of the attenuation characteristic is inadequate in many respects since it is desirable to design filter chains as compact as ever possible.

My invention consists in certain features of novelty which will be readily understood from the following description and be pointed out in the appended claims, reference being had to the accompanying drawing, the single figure of which schematically shows one embodiment of my invention.

The problem of compactness in connection with wave filter chains to which reference has been made in the first part of this specification is solved according to the invention by so designing the inductance elements forming part of the individual resonance circuits of a filter chain as to act as auto-transformer capable of capacity transformation in such manner that even a relatively small capacity may be accordingly stepped-up.

This expedient involves the considerable advantage that the size of the capacities may be substantially reduced which considerably facilitates the accommodation of the entire filter chain to the space available for such devices.

The drawing shows a filter chain improved in accordance with the above stated rule. This chain is connected in a line $a$, $b$ over which alternating communication currents are transmitted. Three series resonance circuits 1, 2 and 3, each comprising one capacity and one inductance are connected in tandem in the conductor $a$. Each of the parallel resonance circuits 4 and 5 is shunted between its appertaining series resonance circuit 1 and 2, respectively, and the second conductor $b$ of the above mentioned line and consists of one inductance and one capacity connected in parallel with one another. The inductance of each of the last mentioned parallel or multiple resonance circuits 4 and 5 is peculiar in having tapping points to which the connection to the appropriate series resonance circuit in the conductor $a$ is established. The inductance therefore acts as an auto-transformer which steps up the capacity of the resonance or oscillatory circuit. The provision of an auto-transformer type of inductance as element of a resonance circuit of a filter chain involves the essential advantage that it is possible to obtain a sharply defined and narrow passing range of the filter chain even with the use of relatively small capacities.

What is claimed is:

1. A four-pole narrow band wave filter chain comprising two series branches, a plurality of series resonance circuits connected in tandem in one of said branches, and a number of shunt resonance circuits each consisting of a tapped inductance coil and a capacity shunted thereacross, one end of said coil being connected with the other of said series branches and a tapping point of said coil being connected to said one of said branches intermediate two of said series resonance circuits for stepping-up the capacitance of said shunt resonance circuits.

2. A four-pole narrow band wave filter chain comprising two series branches, a plurality of series resonance circuits connected in tandem in one of said branches, a number of shunt resonance circuits each consisting of a tapped inductance coil and a capacity shunted thereacross, and means for connecting only a part of the inductance coil of each of said shunt resonance circuit between a point of said one of said branches intermediate two of said series resonance circuits and the other of said branches, whereby the effect of said capacity is increased.

MENSO ARENDS.